United States Patent
Chanak et al.

(10) Patent No.: US 6,943,207 B2
(45) Date of Patent: Sep. 13, 2005

(54) SMOKE SUPPRESSANT HOT MELT ADHESIVE COMPOSITION

(75) Inventors: Michael J. Chanak, Forest Lake, MN (US); Cheryl L. Yarian Chase, White Bear Lake, MN (US); Vernon H. Batdorf, Minneapolis, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 121 days.

(21) Appl. No.: 10/243,110

(22) Filed: Sep. 13, 2002

(65) Prior Publication Data

US 2004/0054058 A1 Mar. 18, 2004

(51) Int. Cl.⁷ ............... C09J 131/04; C08K 5/103; C08K 3/38; C08K 3/22
(52) U.S. Cl. ............... 524/277; 524/404; 524/405; 524/432; 524/436; 524/437; 524/464; 524/472
(58) Field of Search ............ 524/277, 404–405, 524/432, 436–437, 464, 470–472, 477, 487–488

(56) References Cited

U.S. PATENT DOCUMENTS

| | | | | |
|---|---|---|---|---|
| 3,909,333 A | 9/1975 | Eastman | ............... | 156/331 |
| 4,439,572 A | 3/1984 | Kindrick | ............... | 524/405 |
| 4,497,926 A | * 2/1985 | Toy | ............... | 524/271 |
| 4,962,148 A | 10/1990 | Orikasa et al. | ............... | 524/504 |
| 4,965,309 A | 10/1990 | Batdorf | ............... | 524/405 |
| 5,059,651 A | 10/1991 | Uneo | | |
| 5,358,991 A | 10/1994 | O'Brien | ............... | 524/399 |
| 5,962,129 A | 10/1999 | Halloran | ............... | 428/355 |
| 6,239,208 B1 | 5/2001 | Halloran et al. | ............... | 524/487 |
| 6,239,250 B1 | 5/2001 | Hefner et al. | ............... | 528/392 |
| 2001/0036548 A1 | 11/2001 | Halloran et al. | ............... | 428/355 |
| 2001/0049025 A1 | 12/2001 | Kollaja et al. | ............... | 428/521 |

FOREIGN PATENT DOCUMENTS

EP    0 281 857 A2    10/1997

OTHER PUBLICATIONS

NISTIR 6242 Annual Conference on Fire Research, Book of Abstracts, (Kellie Ann Beall ed., Nov. 2–5, 1998) (4 pages including pp. 43–44).

* cited by examiner

Primary Examiner—Peter Szekely (57) ABSTRACT

A hot melt adhesive composition that includes thermoplastic polymer, a source of zinc, at least one of aluminum trihydrate and magnesium hydroxide, and no greater than 70% by weight of a source of halogen. Articles that include a porous substrate and the hot melt adhesive composition.

34 Claims, 5 Drawing Sheets

SMOKE SUPPRESSANT HOT MELT ADHESIVE COMPOSITION

BACKGROUND

The invention is directed to suppressing smoke generation in hot melt adhesive compositions.

Hot melt adhesive compositions are used in many applications in a variety of industries. In many of these applications, a government body requires the article in which the adhesive is present to meet one or more flammability or fire retardant tests. UL 900, for example, is a current Underwriters' Laboratory (UL) test method that imposes stringent requirements on the amount of smoke, flame and spark emissions that can be generated by burning filter packs. Filter packs are often constructed from glass fiber webs and a hot melt adhesive composition. Many hot melt adhesive compositions are inherently flammable, at least to some extent. Thus, since glass fiber webs are essentially noncombustible, the binders and adhesive compositions present in the construction may potentially represent a major factor in the amount of flame and smoke generated by the filter during combustion.

Various attempts have been made to improve the flame retardant and/or smoke suppressant properties of hot melt compositions including formulating the compositions with flame retardant and/or smoke suppressant additives. Conventional flame retardant and smoke suppressant additives include, e.g., phosphorus-containing compounds such as a phosphoric acid ester, ammonium polyphosphate and red phosphorus, halogen-containing compounds such as tetrabromobisphenol A, decabromodiphenyloxide and chlorinated polymers, and metal compounds such as magnesium hydroxide, aluminum hydroxide and zinc borate. Halogen-containing compounds exhibit good flame retardant properties and are widely used. However, compositions formulated with halogen-containing compounds tend to generate undesirable levels of smoke when combusted. Other inorganic flame retardant additives include hydrated inorganic compounds, which function by absorbing heat and evolving water vapor or steam. The vapor or steam dilutes the combustible gases that are generated during a fire.

Although advances have been made in achieving hot melt adhesive compositions that exhibit good flame retardant properties, the amount of smoke generated by hot melt adhesive compositions remains at undesirably high levels for many applications. It is often difficult to formulate compositions to simultaneously exhibit good flame retardant properties and smoke suppressant properties. The additives that impart smoke suppressant properties to a composition tend not to be flame retardant.

SUMMARY

In one aspect, the invention features a hot melt adhesive composition that includes thermoplastic polymer, a source of zinc, at least one of aluminum trihydrate and magnesium hydroxide, and no greater than 70% by weight of a source of halogen. In one embodiment the thermoplastic polymer includes ethylene vinyl acetate, polyolefin, ethylene acrylic acid copolymers, polyalkylacrylates, polystyrene, ethylene vinyl alcohol, polyesters, polyamides, rayon, or a combination thereof.

In some embodiments the composition exhibits a measured smoke value of no greater than 55 when measured according to the Indirect Flame Sealed Chamber Smoke Measurement Test Method. In other embodiments the composition exhibits a measured smoke value of no greater than 35 when measured according to the Direct Flame Flowing Gas Smoke Measurement Test Method. In another embodiment the composition exhibits a measured smoke value of no greater than 55 when measured according to the Indirect Flame Sealed Chamber Smoke Measurement Test Method and a measured smoke value of no greater than 35 when measured according to the Direct Flame Flowing Gas Smoke Measurement Test Method.

In other embodiments the composition includes from 1% by weight to about 20% by weight of the zinc source. In some embodiments the composition includes from 1% by weight to about 10% by weight the zinc source. In one embodiment the source of zinc includes zinc oxide.

In one embodiment the composition includes from 10% by weight to about 70% by weight aluminum trihydrate. In another embodiment the composition includes from 10% by weight to about 60% by weight aluminum trihydrate. In other embodiments the composition includes from 20% by weight to about 50% by weight aluminum trihydrate.

In some embodiments the composition includes from 1% by weight to about 20% by weight the zinc source and from 10% by weight to about 70% by weight aluminum trihydrate.

In one embodiment the composition includes a source of magnesium. In some embodiments the composition includes from 1% by weight to about 70% by weight the magnesium source. In other embodiments the composition includes from 1% by weight to about 10% by weight the magnesium source. In some embodiments the composition includes magnesium hydroxide.

In some embodiments the composition includes from 1% by weight to about 20% by weight zinc, from 10% by weight to about 70% by weight aluminum trihydrate, and a source of magnesium.

In some embodiments, the composition includes zinc borate. In other embodiments, the composition includes zinc oxide and zinc borate.

In other embodiments, the composition further includes wax.

In one embodiment, the source of halogen includes halogenated wax. In some embodiments, the source of halogen is selected from the group consisting of chlorinated paraffin wax, chlorinated polyolefins, brominated paraffin wax, organic brominated compounds, and combinations thereof.

In other embodiments, the composition has a viscosity less than 30,000 centipoise (cps) at 300° F. In another embodiment, the composition has a viscosity less than 20,000 cps at 300° F. In some embodiments, the composition has a viscosity less than 10,000 cps at 300° F. In other embodiments, the composition has a viscosity from 2000 cps to 15,000 cps at 300° F.

In one embodiment, the composition intumesces upon burning.

In another embodiment, hot melt adhesive composition includes ethylene vinyl acetate copolymer, a zinc oxide, at least one of aluminum trihydrate and magnesium hydroxide, and a source of halogen.

In another aspect, the invention features a hot melt adhesive composition that includes thermoplastic polymer, magnesium hydroxide, aluminum trihydrate, and a source of halogen. In one embodiment, the composition exhibits a measured smoke value of no greater than 45 when measured according to the Indirect Flame Sealed Chamber Smoke Measurement Test Method.

In other aspects, the invention features an article that includes a porous substrate, and a hot melt adhesive composition that includes thermoplastic polymer, a source of zinc, at least one of aluminum trihydrate and magnesium hydroxide, and a source of halogen.

In one embodiment, the article is a filter and the porous substrate includes a pleated porous substrate. In another embodiment, the substrate includes synthetic polymer, cellulosic polymer, and combinations thereof. In some embodiments, the substrate includes fibers that include synthetic polymer, cellulosic polymer, and combinations thereof. In other embodiments, the filter is capable of passing the UL 900 Class 1 Test Method. In another embodiment, the filter is capable of passing the UL 900 Class 2 Test Method.

The invention features a hot melt adhesive composition that exhibits good flame retardant and smoke suppressant properties.

The invention features pleated filters that can be constructed to pass the UL 900 Class 1 Test Method and/or the UL 900 Class 2 Test Method.

Other features of the invention will be apparent from the following description of the preferred embodiments thereof, and from the claims.

GLOSSARY

In reference to the invention, these terms have the meanings set forth below.

The term "ethylene copolymer" refers to copolymers and terpolymers derived from ethylene.

DETAILED DESCRIPTION

The hot melt adhesive composition includes a thermoplastic polymer, a source of zinc, at least one of aluminum trihydrate and magnesium hydroxide, and a source of halogen. The hot melt composition exhibits good smoke suppressant properties and can be used in the construction of a pleated filter. Preferably the composition is intumescent, i.e., provides a char barrier upon burning.

The hot melt adhesive composition also exhibits a value no greater than 55, more preferably no greater than 45, most preferably no greater than 30 when measured according to the Indirect Flame Sealed Chamber Smoke Measurement Test Method, and a value no greater than 75, more preferably no greater than 35, most preferably no greater than 15 when measured according to Direct Flame Flowing Gas Smoke Measurement Test Method.

The adhesive composition has a viscosity suitable for hot melt application processes, preferably the adhesive composition exhibits a viscosity suitable for use in hot melt pump application processes. Preferably the adhesive composition exhibits a viscosity less than 30,000 cps, in some embodiments less than 20,000 cps, in other embodiments less than 10,000 cps, in other embodiments from 2000 cps to 15,000 cps, in other embodiments greater than 2000 cps, in other embodiments greater than 5000 cps at 300° F. (150° C.). Preferably the viscosity of the adhesive composition is suitable for application at less than 300° F., more preferably at temperatures from about 280° F. to about 300° F.

Alternatively, the adhesive composition can be formulated to exhibit a higher viscosity for use in applications including, e.g., extruder, gear pump, drum unloader and platen drum unloader applications.

Suitable thermoplastic polymers include, e.g., vinyl acetate, ethylene copolymers including, e.g., ethylene vinyl acetate, ethylene acrylic acid (e.g., ethylene methacrylic acid copolymers), ethylene n-butyl acrylates, ethylene methyl (meth) acrylates, ethylene ethylacrylates, and interpolymers of ethylene with at least one $C_3$ to $C_{20}$ α-olefin, polymethyl methacrylate, polyesters, polyamides, polyolefins (e.g., polyethylene, polypropylene, and polybutylene, copolymers and terpolymers of ethylene and propylene), and combinations thereof.

Preferred thermoplastic polymers have a melt index greater than about 400 g/10 minutes, more preferably greater than about 800 g/10 min when measured according to ASTM D 1238 at 190° C. using a 2.16 kg weight.

For ethylene copolymers, the copolymer content is preferably from about 25% to about 45% by weight of the polymer, more preferably from about 25% to about 35% by weight of the polymer. Preferred ethylene vinyl acetate copolymers have a vinyl acetate content of about 28% by weight of the polymer and a melt index of about 400 g/10 minutes.

In one useful embodiment, the thermoplastic polymer includes a blend of ethylene vinyl acetate copolymers having a vinyl acetate content of about 28% and having melt indices of 800 g/10 min and 2500 g/10 min.

Suitable commercially available ethylene vinyl acetate copolymers are available under the ELVAX ULTRATHENE trade designation from Du Pont de Nemours & Co. (Wilmington, Del.).

Suitable commercially available ethylene n-butyl acrylate copolymers are available from Elf Atochem North America (Philadelphia, Pa.) under the trade designation LOTRYL, from Exxon Chemical Co. (Houston, Tex.) under the trade designation ESCORENE, from Du Pont, under the trade designation ELVALOY, and from Millennium Petrochemicals (Rolling Meadows, Ill.) under the trade designation ENATHENE.

Useful ethylene methyl acrylate copolymers are available from Exxon Chemical Co. under trade designation OPTEMA.

Useful interpolymers of ethylene with at least one $C_3$ to $C_{20}$ α-olefin include homogeneous linear or substantially linear polymers further characterized in that each interpolymer has a polydispersity of less than about 2.5. Examples of suitable interpolymers of ethylene with at least one $C_3$ to $C_{20}$ α-olefin include the ethylene-butene copolymers available under the trade designation EXACT from Exxon Chemical Co., and ethylene-propylene copolymers available under the trade designation EXXPOL also from Exxon Chemical Co. Suitable ethylene/1-octene copolymers and interpolymers are available under the trade designations AFFINITY, INSITE and ENGAGE from Dow Chemical Co. (Midland, Mich.).

The source of zinc can be any compound capable of providing zinc to the composition including, e.g., zinc, zinc oxide, zinc borate, zinc orthophosphate, zinc pyrophosphate, zinc carbonate, zinc sulfide, zinc stannate, zinc molybdate, and combinations thereof. Useful commercially available zinc sources include, e.g., KADOX 911 zinc oxide from Cary Company (Addison, Ill.) and FIREBRAKE ZB zinc borate from U.S. Borax (Valencia, Calif.).

Preferably the source of zinc is present in the adhesive composition in an amount from 1% by weight to about 20% by weight, more preferably from about 1% by weight to about 10% by weight, most preferably from about 1% by weight to about 7% by weight.

Aluminum trihydrate, which has the chemical formula $Al(OH)_3$ or $AL_2O_3 \cdot 3H_2O$, is known as aluminum hydroxide, aluminum trihydroxide, alumina trihydrate, hydrated alumina, aluminum hydrate, and hydrated aluminum oxide. Aluminum trihydrate is commercially available from Akron Chemical Co. (Akron, Ohio), Aluchem Inc. (Ohio Washington), CSA Chemical (New Jersey), GCA Chemical Corp (Connecticut), and Great Lakes Minerals Co. (Michigan), New England Resins and Pigments Corp. (Massachusetts).

Aluminum trihydrate, when present in the composition, is preferably present in the adhesive composition in an amount from 10% by weight to about 70% by weight, more preferably from about 10% by weight to about 60% by weight, most preferably from about 2% by weight to about 50% by weight.

The adhesive composition can optionally include a source of magnesium. Useful sources of magnesium include, e.g., magnesium carbonate, magnesium phosphate, magnesium hydroxide, magnesium distearate, and combinations thereof. One example of a suitable commercially source of magnesium is available under the trade designation MHT-100 magnesium hydroxide TE from Univar USA Inc. (Houston, Tex.).

The source of magnesium is preferably present in the adhesive composition in an amount from 1% by weight to about 70% by weight, more preferably from 1% by weight to 10% by weight, most preferably from about 2% by weight to about 8% by weight. Magnesium hydroxide, when present in the adhesive composition, is preferably present in an amount of from 2% by weight to about 70% by weight, more preferably from about 2% by weight to about 10% by weight, most preferably from about 2% by weight to about 8% by weight.

Suitable sources of halogen include, e.g., halogenated wax including, e.g., chlorinated paraffin wax, brominated paraffin wax, halogenated polyolefins, brominated organic compounds, and combinations thereof. Useful commercially available chlorinated paraffin wax is available under the trade designation CHLOREZ from Dover Chemical Corp. (Dover, Ohio).

The halogenated component is preferably present in the adhesive composition in an amount no greater than 70% by weight, preferably from 10% by weight to about 70% by weight, more preferably from 2% by weight to 40% by weight, most preferably from about 15% by weight to about 30% by weight.

The adhesive composition can optionally include other wax components. An example of a useful class of wax is high melting point wax, i.e., wax having a melting point greater than 80° C., which also include waxes having a melting point greater than 90° C., greater than 100° C., less than 120° C. and less than 115° C.

Examples of suitable high melting point waxes include synthetic high melting point waxes and high melting point microcrystalline waxes. Synthetic high melting point waxes include high density, low molecular weight polyethylene waxes, by-product polyethylene waxes (i.e., waxes that are the by-product of a process (e.g., petroleum cracking processes) used to obtain another chemical), and Fischer-Tropsch waxes. Examples of commercially available waxes include PETROLITE C-4040, and POLYWAX 1000, 2000 and 3000 low molecular weight polyethylene waxes available from Petrolite Corp. (Tulsa, Okla.). ESCOMER H-101 modified polyethylene wax available from Exxon Chemical Co., MARCUS 100, 200 and 300 low molecular weight polyethylene waxes available from Marcu Chemical Co., (Houston, Tex.), and PARAFLINT H-1, H-4 and H-8 Fischer-Tropsch waxes from Sasol-SA/Moore & Munger (Shelton, Conn.).

Suitable microcrystalline waxes have at least about 50% by weight cyclo-or branched alkanes having from 30 to 100 carbon atoms. Useful microcrystalline waxes have a melting point greater than about 75° C. in other embodiments greater than about 80° C., in other embodiments greater than 90° C. Useful commercially available microcrystalline waxes include BE SQUARE 175 Amber Wax having a melting point of 80° C., BE SQUARE 185 Amber Wax having a melting point of 85° C., and BE SQUARE 185 Amber Wax having a melting point of 90° C. all from Petrolite Corp., and PETROWAX 9508 LIGHT from Petrowax Pa., Inc. (New York, N.Y.).

Preferably the wax is present in the composition in an amount sufficient to lower the viscosity of the composition without increasing the smoke generation of the composition. The wax can be present in the adhesive composition in an amount no greater than 35% by weight, more preferably from about 5% by weight to about 35% by weight, in other embodiments from about 10% by weight to about 30% by weight, in other embodiments from about 15% by weight to about 25% by weight.

The adhesive composition can optionally include paraffin waxes and lower melting point microcrystalline waxes. Useful paraffin waxes have a Ring and Ball softening point from about 50° C. to about 80° C. Examples of commercially available waxes include OKERIN 236 TP from Astor Wax Corporation (Doraville, Ga.), PENTRECO 4913 from Pennzoil Products Co. (Houston, Tex.) R-7152 paraffin wax from Moore & Munger (Shelton Conn.), and paraffin wax 1297 from International Waxes, Ltd. (Ontario, Canada).

Examples of useful lower melting point microcrystalline waxes include VICTORY Amber wax, which has a 70° C. melting point and is available from Petrolite Corp. (Tulsa Okla.), BARECO ES-796 Amber wax, which has a 70° C. melting point and is available from Bareco (Chicago, Ill.), and OKERIN 177, which has an 80° C. melting point and is available from Astor Wax Corp. The paraffin and lower melting point microcrystalline waxes are preferably present in the adhesive composition in an amount sufficient to lower the viscosity of the adhesive composition and can be present in the adhesive composition in an amount of no greater than about 20%, preferably no greater than about 10% by weight.

The adhesive composition can also include other flame retardant additives including, e.g., organic flame retardants and inorganic flame retardants. Organic flame retardants include, e.g., phosphate esters, chlorinated alicyclic hydrocarbons, fluoropolymers, polyvinyl chloride and halogenated organic compounds including, e.g., substituted benzenes, e.g., tetrabromobenzene, hexachlorobenzene, hexabromobenzene, biphenyls, e.g., 2,2'-dichlorobiphenyl, 1,4'-dibromobiphenyl, 2,4'-dichlorobiphenyl, hexabromobiphenyl, octabromobiphenyl, decabromobiphenyl, and halogenated diphenyl ethers containing 2 to 10 halogen atoms.

Useful organic phosphorus flame retardant additives form protective liquid or char barriers that act to insulate and minimize heat transfer. Examples of suitable phosphate compounds include organic phosphonic acids, phosphonates, phosphonates, phosphinites, phosphinites, phosphine oxides, phosphates, phosphonitrilic chloride, phosphorus ester amides, phosphoric acid amides, phosphonic acid amides and phosphinic acid amides.

Inorganic flame retardants, which are often referred to as fillers, include some of the components set forth above and in addition include antimony pentoxide, sodium antimonite, barium metaborate, molybdenum, molybdic oxide, ammonium molybdate, phosphoric acid, tin, ammonium octamolybdate, calcium silicates, and hydrated calcium carbonates.

The adhesive composition can optionally include a plasticizer. Useful plasticizers include, e.g., liquid elastomers including, e.g., polybutenes and polyisobutylenes. Examples of useful commercially available plasticizers include PARAPOL 1300 liquid polybutene from Exxon Chemical Co., and liquid butene homopolymers available under the INDOPOL series of trade designations including INDOPOL H-50, INDOPOL H-100 and INDOPOL H-300, which are available from Amoco Corp. (Chicago, Ill.). The plasticizer can be present in the adhesive composition in an amount from 0% by weight to about 10% by weight.

The adhesive composition optionally includes antioxidant. Suitable hindered phenol antioxidants are commercially available under the IRGANOX series of trade designations including, e.g., IRGANOX 565, IRGANOX 1010 and IRGANOX 1076, from Ciba-Geigy (Hawthorne, N.Y.). These antioxidants can be used alone or in combination with other antioxidants including, e.g., phosphite antioxidants available under the IRGAFOS 168 trade designation from Ciba-Geigy. Other useful antioxidants include, e.g., CYANOX LTDP from Cytec Industries (Stamford, Conn.), and ETHANOX 1330 from Albemarle Corp. (Baton Rouge, La.). Antioxidant can be present in the composition in an amount from 0% by weight to about 1% by weight, preferably from about 0% by weight to about 0.5% by weight.

The adhesive composition can optionally include tackifying agent. Examples of useful classes of tackifying agents include aliphatic, cycloaliphatic and aromatic hydrocarbon resins, and modified hydrocarbon resins; terpenes and modified terpenes; rosins and modified rosins, including rosin esters; and mixtures thereof.

Examples of available tackifying resins include cycloaliphatic hydrocarbon resins available under the trade designations EASTOTAC and EASTOTAC H-142R from Eastman Chemical Co. (Kingsport, Tenn.), partially hydrogenated cycloaliphatic petroleum hydrocarbon resins available under the trade designations ESCOREZ 5300 and ESCOREZ 5400, and partially hydrogenated aromatic modified petroleum hydrocarbon resin available under the trade designation ESCOREZ 5600, all from Exxon Chemical Company (Houston, Tex.), aliphatic, aromatic petroleum hydrocarbon resin available under the trade designation WINGTACK Extra, aromatic modified synthetic polyterpene hydrocarbon resin available under the trade designation WINGTACK 86, synthetic polyterpene resins available under the trade designation WINGTACK 95 all from Goodyear Tire and Rubber Co. (Akron, Ohio), synthetic petroleum hydrocarbon resins available under the trade designations ARKON P-70, P-90 and P-100 from Arakawa Chemical (USA) Inc. (Chicago, Ill.), partially hydrogenated cycloaliphatic petroleum hydrocarbon resin available under the trade designation HERCOLITE 2100 from Hercules, Inc. (Wilmington, Del.), and styrenated terpene hydrocarbon resin available under the trade designation ZONATAC 105 LITE from Arizona Chemical (Panama City, Fla.), and alphamethyl styrene resins available under the trade designations KRISTALEX 3070, 3085 and 3100 from Hercules (Wilmington, Del.). Examples of useful modified rosins include pentaerythritol rosin esters available under the trade designations SYLVATAC 1103 and ZONESTER 100 from Arizona Chemical and PERMALYN 305 from Hercules, and glycerol rosin ester of tall oil available under the trade designation SYLVATAC 1085 from Arizona Chemical. Other examples of rosin and modified rosin tackifying agents include gum rosins, wood rosins, tall-oil rosins, distilled rosins, dimerized rosins and polymerized rosins, examples of which include glycerol and pentaerythritol esters of wood rosins and tall-oil rosins.

The tackifying resin, when present in the adhesive composition, is preferably present in a sufficiently small amount so as to contribute only minimally or not at all to smoke generation. The tackifying resin can be present in the adhesive composition in an amount from 0% by weight to about 10% by weight, in other embodiments from about 1% by weight to about 10% by weight, in other embodiments from about 3% by weight to about 7% by weight, in other embodiments from about 3% by weight to about 5% by weight.

The adhesive composition can also include other components including, e.g., pigment (e.g., titanium dioxide), talc, wollastonite, mica, feldspar, alkaline earth metal sulfates, alkali metal aluminum silicates, alkali metal carbonates, zinc silicates and combinations thereof.

The adhesive composition can be applied as a continuous or discontinuous (e.g., intermittent or interrupted) coating, a continuous or discontinuous bead, randomly or in a pattern (e.g., a stitch pattern).

The adhesive composition is suitable for bonding a variety of substrates including, e.g., porous substrates, nonporous substrates, woven webs, nonwoven webs (e.g., glass fiber webs), fibers, filaments, films, paper, and polymeric substrates including, e.g., synthetic polymers, cellulosic polymers, and combinations thereof.

The adhesive composition is suitable for use in a variety of applications including, e.g., filters, pipe wrapping, flexible heat duct sealants, for potting and encapsulating electrical components, and cable filling.

The adhesive composition is particularly well suited for use in pleated filter constructions that include a pleated porous web (e.g., a fiberglass nonwoven web). The adhesive composition is generally applied to the filter media when the filter media is in a continuous strip and has not yet been folded or pleated. Alternatively or in addition, the adhesive composition can be applied after pleating.

One example of a class of filters is High Efficiency Particulate Arrestance (HEPA) filters. HEPA filters can include pleats and are often made from a fiber glass composite web. Various types of HEPA filters are available including those HEPA filters described in, e.g., U.S. Pat. Nos. 4,365,980, 4,885,015, and 5,098,767, and incorporated herein.

Preferably the filters that include the adhesive composition pass the UL 900 Class 1 Test Method, the UL 900 Class 2 Test Method or both test methods.

The invention will now be described further by way of the following examples. All parts, ratios, percents and amounts stated in the Examples are by weight unless otherwise specified.

EXAMPLES

Test Procedures

Test procedures used in the examples include the following.

Indirect Flame Sealed Chamber Smoke Measurement Test Method

Figure 1:
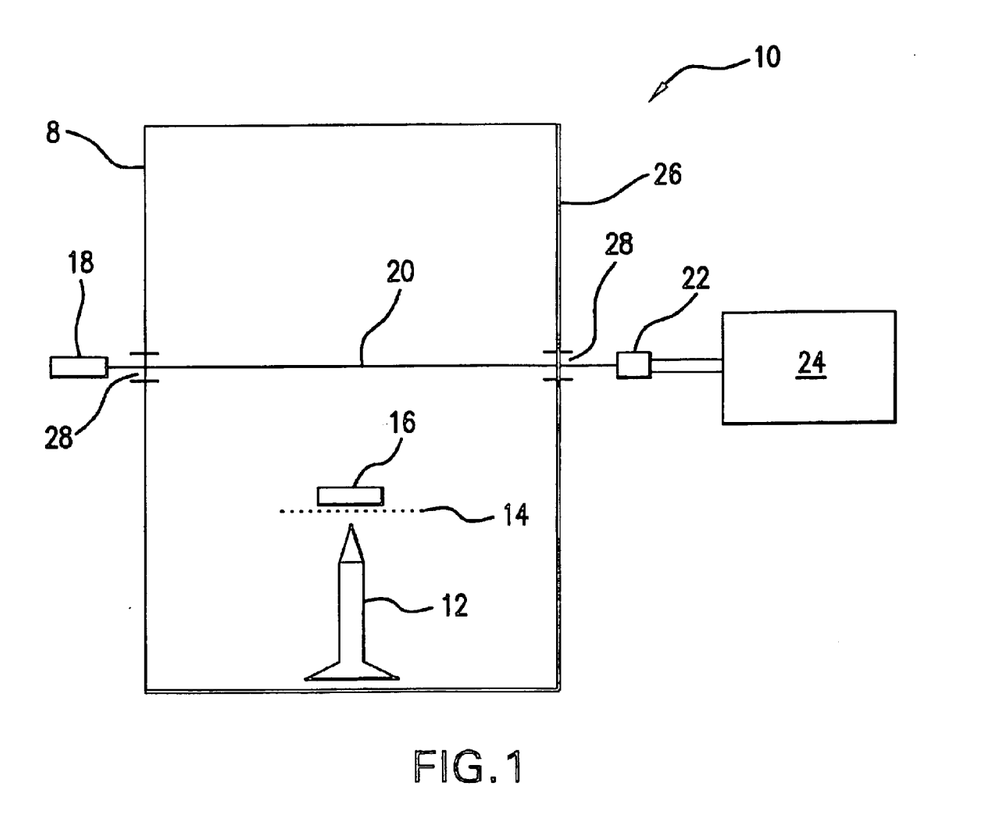
FIG. 1 is a diagram of an apparatus for measuring smoke generation.
Figure 2:
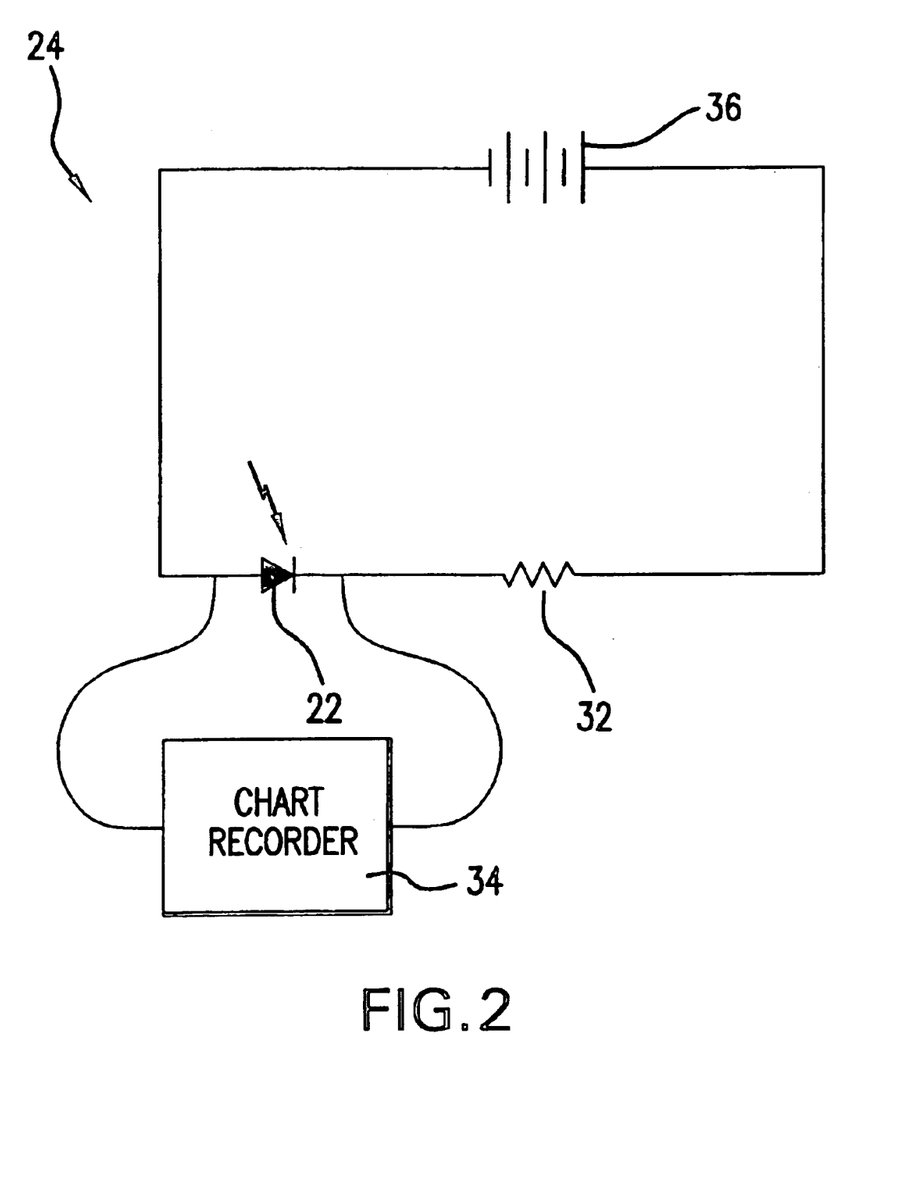
FIG. 2 is a diagram of the light measurement circuit of the apparatuses of FIGS. 1 and 3.

Referring to FIGS. 1 and 2, the apparatus 10 for measuring smoke generation includes a smoke chamber 8 capable of maintaining smoke generated therein and including a removable glass door to seal the chamber (not shown), a burner 12 positioned in the chamber 8, a light path 20 extending from a laser 18 light source to a photocell 22, and a light measurement circuit 24. The burner 12 is a standard laboratory Bunsen burner operating on natural gas. The burner can be rotated to direct the flame away from or towards the sample by turning the rotation handle and linkage.

The light path 20 is the length of the light beam that passes through the smoke chamber 8. To protect the laser 18 and the photocell 22, glass windows 28 are positioned in the chamber walls 26 at the point at which the light path 20 passes through the chamber walls 26.

The light measurement circuit 24 includes a power source, e.g., a battery, 36, a CdS photocell 22, a resistor 32, and a chart recorder 34 for measuring the change in voltage across the photocell 22.

Calibration

The system is calibrated by evacuating all smoke from inside the chamber 8. The glass windows are clean, the laser 18 is turned on and the chart recorder is set to read in millivolts (mV).

The 100% transmittance mV reading from the chart recorder is measured and recorded.

The transmittance of a set of neutral density filters with known transmittance values is measured and recorded in mV. A transmittance versus mV correlation curve is generated from the data obtained.

Apparatus Preparation

The glass windows of the apparatus are clean and free of soot. The Bunsen burner is ignited, the gas flow rate is set to 540 standard mL/minute, and then the gas is shut off and the burner flame is rotated away from the sample area. The laser is energized and positioned such that the laser dot hits the center of the photocell. The chart recorder is turned on and set to the appropriate range for the measurements (i.e., a range such that the chart recorder does not go off scale during the measurement). The paper speed is set to 1 cm/min.

Sample Preparation A 30-mil thick film of the composition to be tested is drawn down. Five squares ½ in. x½ in. are cut from the film. The weight of each sample square is measured and recorded. The target weight for each square is 0.25±0.01 gm.

The sample square is then placed on the wire screen. The Bunsen burner is ignited and the glass cover of the chamber is closed. The movement of the paper on the chart recorder is started. The burner is rotated so that the burner flame is directly beneath the sample on the screen. The sample is allowed to burn for 3 minutes, after which the movement of the chart paper is stopped. The sample number, chart speed, and mV scale are recorded on the chart trace.

Analysis

The mV change across the photocell as a function of time provided on the chart recorder is converted to tabular data. The mV reading before the burner is rotated under the sample is the baseline. When the sample is burning, the mV trace may be erratic with peaks and valleys. Once the material has been consumed, the trace stabilizes and plateaus. The plateau value will start to drop as the smoke aggregates and deposits on the chamber walls. The peak of the plateau is the best indication of total smoke and should be used as the peak reading for subsequent calculations.

Smoke density is determined according to Bouguer's Law where T is the transmittance, $M_s$ is the smoke density (gm smoke/m$^3$), $\sigma_s$ is the specific extinction coefficient (8.7 m$^2$/gM) and L is the light path length (m).

Bouguer's Law $T = e^{-\sigma_s \cdot M_s \cdot L}$

Rearranging Bouguer's Law including peak transmittance ($T_{peak}$) and baseline transmittance ($T_{baseline}$) values yields:

$$M_s = \frac{-\ln\left(\frac{T_{peak}}{T_{baseline}}\right)}{\sigma_s \cdot L}$$

The smoke density, $M_s$, is calculated according to the above equation.

The grams of smoke generated per gram of sample ($G_s$) is determined by multiplying the smoke density value, $M_s$, by the chamber volume V (m$^3$), and dividing the result by the sample weight W1 (gm), to yield the grams of smoke per gram of sample ($G_s$).

The value, Gs, is then normalized to the result obtained with a composition prepared according to Control 1. To normalize, the value from the sample is divided by the result from Control 1 and then multiplied by 100. The composition of Control 1 is set forth in Table 1 below. A value for the composition prepared according to Control 1 is determined each day that a run is conducted to eliminate day-to-day variations in the apparatus.

Direct Flame Flowing Gas Smoke Measurement Test Method

Apparatus

Figure 3:
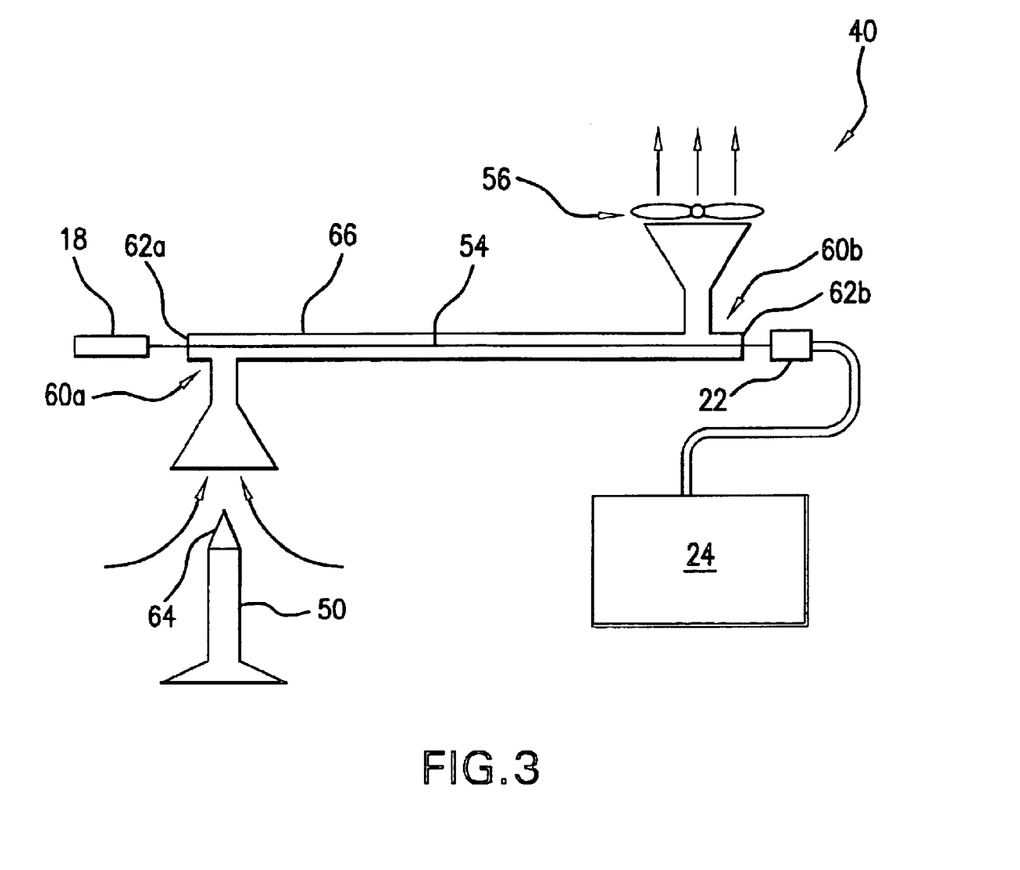
FIG. 3 is a diagram of an apparatus for measuring smoke generation.

Referring to FIGS. 2 and 3, the apparatus 40 for measuring smoke generation includes a standard laboratory Bunsen burner 50 operating on natural gas, a laser 18 light source, a light path 54, a photocell 22, glass windows (not shown) positioned on the end 62 of each tee 60, a fan 56 positioned to draw the smoke generated in the burner flame 64 through the light path 54 at a fixed flow rate, and a light measurement circuit 58, 60. The light path 54 is formed from a length of ½ in. rigid copper pipe 66 with straight through tees 60a, 60b on each end 62a, 62b. Glass windows are installed on the end of each tee 60a, 60b to protect the laser 52 and the photocell 22.

The light measurement circuit 22, 24 includes a power source, e.g., a battery 36, a CdS photocell 22, a resistor 32, and a chart recorder 34 for measuring the voltage drop across the photocell 22.

Experimental Procedure

Sample Preparation

Five metal wires approximately 3 in long are prepared for each adhesive composition to be measured. The wires are heated in a Bunsen burner until 1 in. to 1½ in. of the end of the wire is glowing red hot. The wires are allowed to cool and then wiped with a paper towel. Each wire is weighed with as great accuracy as possible (preferably +/−0.0001 gm). One inch of the tip of each wire is coated with adhesive composition by first heating the wire slightly, rubbing the wire on the sample adhesive composition, removing the wire from the composition, and then cooling the sample and wire. The adhesive coated wires are then weighed to determine the weight of adhesive on the wire $W_1$.

Apparatus Set-up

The glass windows protecting the photocell and laser are observed to be clean and free of soot. The laser is energized with the light emitted directed down the center of the copper pipe. A piece of tissue paper is held over the end of the light path to identify where the dot formed by the laser is on the tissue. The photocell is placed in position accordingly. The fan is turned on such that air is flowing. The Bunsen burner is ignited. The chart recorder is turned on and set to the appropriate range (i.e., a range such that the chart recorder does not go off scale during the measurement). Samples of different weights may have to be run in order to identify the proper range for the chart recorder. The paper speed is set to 30 cm/sec. The gas and airflow rates are set and held constant over the course of the measurements to minimize burner influences on the results.

Calibration

The transmittance of a set of neutral density filters with known transmittance values is measured and recorded in mV. A transmittance versus mV correlation curve is generated from the data obtained.

Sample Measurement

The chart recorder is turned on such that the paper is moving. The Bunsen burner is placed under the apparatus intake funnel. A wire coated with the adhesive composition to be tested is positioned in the burner flame. The wire is maintained in position in the burner flame until the sample no longer emits bright yellow flames or smoke, at which point the burner is removed from under the intake, and the movement of the chart recorder paper is stopped. The sample number and the chart mV range are recorded next to the chart trace.

Analysis

The chart recorder provides the mV change across the photocell as a function of time. The trace will start at the baseline, rise to a maximum and then fall back to the baseline. The trace is converted to tabular data by selecting a time step, t (e.g., 0.5-second), and creating a table of time versus mV readings at each time step increment.

An instantaneous smoke density at each time increment is determined according to Bouguer's Law where T is the transmittance, $M_s$ is the smoke density (gm smoke/m$^3$), $\sigma_s$ is the specific extinction coefficient (8.7 m$^2$/gm) and L is the light path length (m).

Bouguer's Law $T = e^{-\sigma_s \cdot M_s \cdot L}$

Rearranging Bouguer's Law including instantaneous transmittance ($T_{instantaneous}$) and baseline transmittance ($T_{baseline}$) values yields:

$$M_{s, instantaneous} = \frac{-\ln\left(\frac{T_{instantaneous}}{T_{baseline}}\right)}{\sigma_s \cdot L}$$

The instantaneous smoke density, $M_{s, instantaneous}$, is calculated according to the above equation.

The sum of the instantaneous smoke densities multiplied by the time step size (t) in seconds and by the air volumetric flow rate Q (m$^3$/s) through the apparatus yields the mass of smoke produced. Dividing the mass of smoke produced by the sample weight W1 (gm) yields the grams of smoke produced per gram of sample ($G_s$).

The value, Gs, is then normalized to the result obtained with a composition prepared according to Control 1. To normalize the value, the value from the sample is divided by the result from Control 1 and then multiplied by 100. The composition of Control 1 is set forth in Table 1 below. A value for the composition prepared according to Control 1 is determined each day that a run is conducted to eliminate day-to-day variations in the apparatus.

Viscosity

The melt viscosity of a composition is determined at 300° F. on a Brookfield Thermosel Viscometer Model RVDVII+ (Brookfield Engineering Laboratories, Inc. Middleboro, Mass.) using a number 29BS solid shaft spindle operating between 25% and 75% of the useable range at 50 rotations per minute (rpm). The spindle speed may need to be varied depending upon the viscosity of the composition to ensure accuracy.

Oxygen Index (LOI)

The Oxygen Index is measured according to ASTM D 2863-74 Test for Flammability of Plastics Using the Oxygen Index Method (Type D materials) (1974). The procedure is conducted using an Oxygen Index Flammability Gauge Model FM11B (Tritec Inc., Columbia, Md.).

Control 1 and Examples 1–12

The compositions of the Control 1 and Examples 1, 4, 6, and 9 were prepared by combining with mixing ESCORENE MV02528 ethylene vinyl acetate containing 28% vinyl and having a melt index of 2500 (ExxonMobil Chemical, Houston, Tex.), KADOX 911 zinc oxide (Cary Company, Dover, Ohio), MHT-100 magnesium hydroxide TE (Univar USA Inc., Houston, Tex.), ZB-467 zinc borate (Great Lakes Chemical Corp., Carol stream, Ill.), TIONA RCL-4 titanium dioxide (Ashland Chemical and Solvents, Shakopee, Minn.), A208 aluminum trihydrate (Univar USA Inc.), BNX 1010 antioxidant (Mayzo Inc., Norcross, Ga.), BARECO PX-100 high melting point synthetic wax (Bareco Products, Charlotte, N.C.), PLASTHALL ESO plasticizing oil (CP Hall Company, Chicago, Ill.), and CHLOREZ 700 SSNP chlorinated paraffin wax (Dover Chemical Co., Dover, Ohio) in the amounts specified (in parts per hundred (pph)) in Table 1.

The compositions of Examples 2, 3, 5, 7, 8, and 10–12 were prepared by combining, with mixing, the composition of the Control 1, KADOX 911 zinc oxide (Cary Co.), MHT-100 magnesium hydroxide (Univar USA Inc.) and ZB-467 zinc borate (Great Lakes Chemical), in the amounts specified (in parts per hundred (pph)) in Table 2.

The compositions of the Control 1 and Examples 1–11 were tested according to the Indirect Flame Sealed Chamber Smoke Measurement Test Method. The results are reported in Table 1 in units of % by weight.

Figure 5:
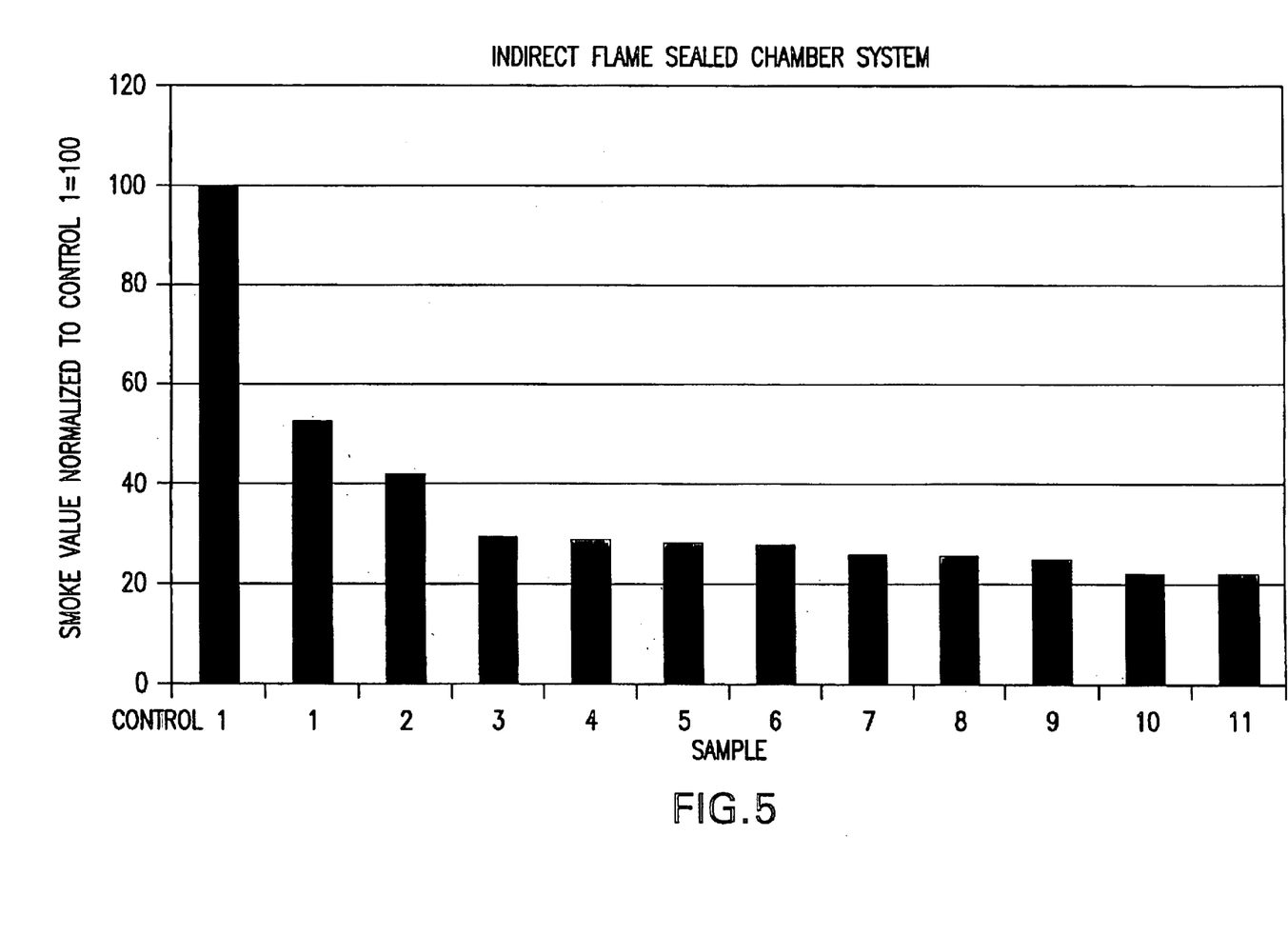
FIG. 5 is graph of the Smoke Value Normalized to Control 1 vs. Sample as measured in the Indirect Flame Sealed Chamber System

The results, normalized to the results produced by the composition of the Control, are displayed graphically in FIG. 5.

TABLE 1

| Sample | EVA | ZnO | MgOH | Zinc Borate | TiO$_2$ | Aluminum Trihydroxide | Anti-oxidant | Wax | Plas-ticizing oil | Chlorinated Paraffin Wax | Measured Smoke | Viscosity (cps) |
|---|---|---|---|---|---|---|---|---|---|---|---|---|
| Control 1 | 15.0 | 0 | 0 | 0 | 2.0 | 57.5 | 0.5 | 4.0 | 1.0 | 20.0 | 100 | NT |
| Example 1 | 16.3 | 2.2 | 4.3 | 3.8 | 2.2 | 43.5 | 0.5 | 4.3 | 1.1 | 21.7 | 52 | 11,400 |
| Example 2 | 14.4 | 0 | 4.0 | 0 | 1.9 | 55.2 | 0.5 | 3.8 | 1.0 | 19.2 | 42 | 21,000[1] |
| Example 3 | 13.9 | 0 | 4.0 | 3.5 | 1.9 | 53.2 | 0.5 | 3.7 | 0.9 | 18.5 | 30 | NT |
| Example 4 | 15.4 | 2.1 | 4.1 | 3.6 | 2.1 | 46.6 | 0.5 | 4.1 | 1.0 | 20.5 | 29 | 16,480 |
| Example 5 | 14.5 | 0 | 0 | 3.5 | 1.9 | 55.5 | 0.5 | 3.9 | 1.0 | 19.3 | 28 | 18,800 |
| Example 6 | 15.0 | 2.0 | 4.0 | 3.5 | 2.0 | 48.0 | 0.5 | 4.0 | 1.0 | 20.0 | 28 | NT |
| Example 7 | 14.2 | 2.0 | 0 | 3.5 | 1.9 | 54.3 | 0.5 | 3.8 | 0.9 | 18.9 | 27 | NT |
| Example 8 | 14.1 | 2.0 | 4.0 | 0 | 1.9 | 54.1 | 0.5 | 3.8 | 0.9 | 18.8 | 26 | NT |
| Example 9 | 15.8 | 2.1 | 4.2 | 3.7 | 2.1 | 45.1 | 0.5 | 4.2 | 1.1 | 21.1 | 26 | 14,700 |
| Example 10 | 14.7 | 2.0 | 0 | 0 | 2.0 | 56.4 | 0.5 | 3.9 | 1.0 | 19.6 | 23 | NT |
| Example 11 | 13.6 | 2.0 | 4.0 | 3.5 | 1.8 | 52.0 | 0.5 | 3.6 | 0.9 | 18.1 | 23 | 26,500[1] |

[1] = tested at 20 rotations per minute

The compositions of Control 1 and Examples 2, 3, 5, 7, 8, and 10–12 were tested according to the Direct Flame Flowing Gas Smoke Measurement Test Method. The results are reported in Table 2 in units of % by weight.

Figure 4:
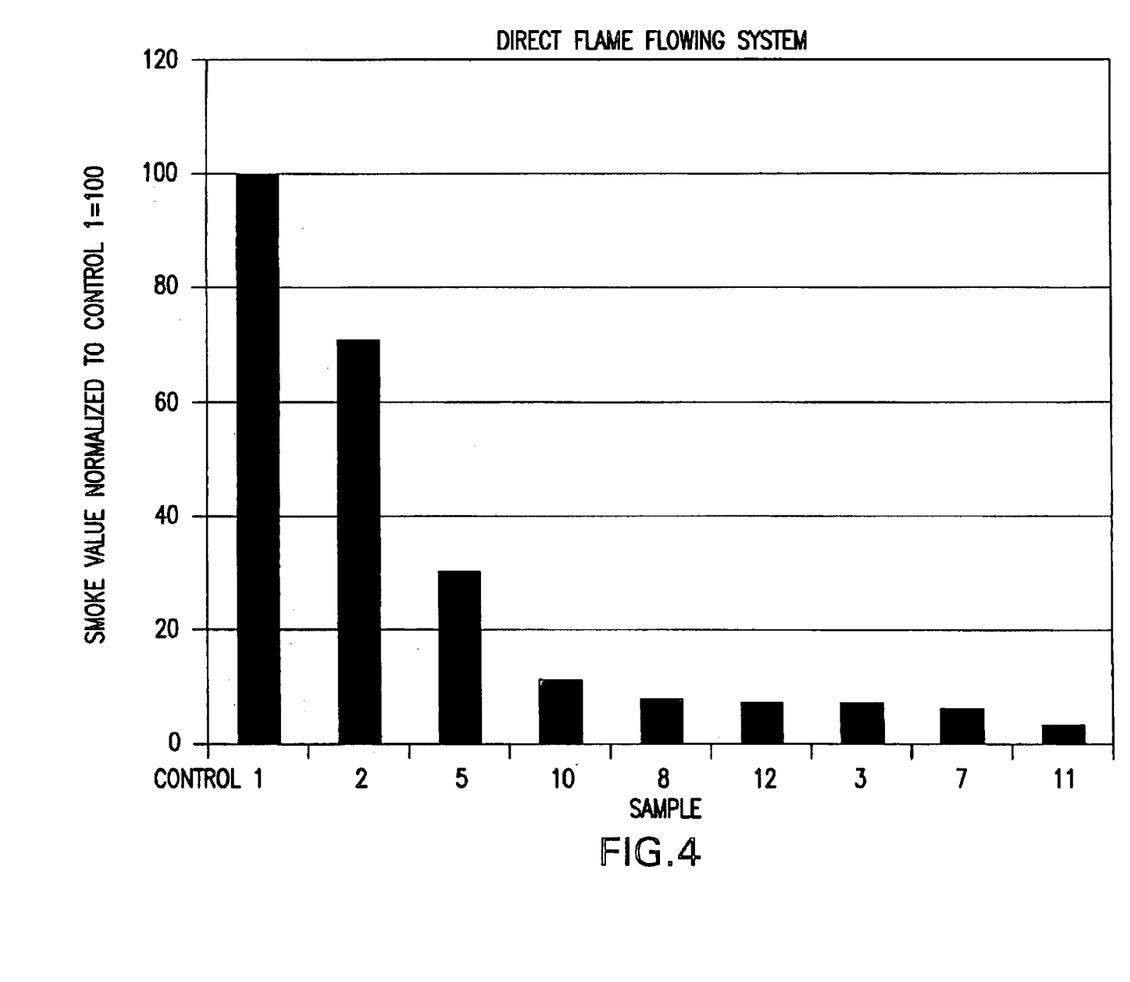
FIG. 4 is graph of the Smoke Value Normalized to Control 1 vs. Sample as measured in the Direct Flame Flowing System.

The results, normalized to the Control 1, are displayed graphically in FIG. 4.

TABLE 2

| Example | Control 1 | ZnO | MgOH | Zinc Borate | Measured |
|---|---|---|---|---|---|
| Control 1 | 100.0 | — | — | — | 100 |
| Example 2 | 96.0 | — | 4.0 | — | 73 |
| Example 5 | 96.5 | — | — | 3.5 | 31 |
| Example 10 | 98.0 | 2.0 | — | — | 11 |
| Example 8 | 94.0 | 2.0 | 4.0 | — | 8 |
| Example 12 | 96.0 | 4.0 | — | — | 7 |
| Example 3 | 92.5 | — | 4.0 | 3.5 | 7 |
| Example 7 | 94.5 | 2.0 | — | 3.5 | 6 |
| Example 11 | 90.5 | 2.0 | 4.0 | 3.5 | 3 |

The melt viscosity at 300° F. and the oxygen index of the compositions of the Control and Examples 1, 3, 5, 8, and 10 were measured. The results are reported in Table 3 in centipoise (cps) and % oxygen.

TABLE 3

| Example | Viscosity (cps) | LOI (% oxygen) |
|---|---|---|
| Example 1 | 11,400 | 52–56 |
| Example 9 | 14,700 | 58 |
| Example 4 | 16,480 | 58 |
| Example 5 | 18,800 | 62 |
| Example 11 | 26,500 | 66 |
| Control 1 | 15,500 | 70+ |

Other embodiments are in the claims.

What is claimed is:

1. A hot melt adhesive composition comprising
thermoplastic polymer;
a source of zinc comprising zinc oxide;
at least one of aluminum trihydrate and magnesium hydroxide; and
from 2% by weight to 40% by weight of a source of halogen.

2. The hot melt adhesive composition of claim 1, wherein said thermoplastic polymer comprises ethylene vinyl acetate, polyolefin, ethylene acrylic acid copolymers, polyalkylacrylates, polystyrene, ethylene vinyl alcohol, polyesters, polyamides, rayon, interpolymer of ethylene and octene, or a combination thereof.

3. The hot melt adhesive composition of claim 1, wherein said composition exhibits a measured smoke value of no greater than 55 when measured according to the Indirect Flame Sealed Chamber Smoke Measurement Test Method.

4. The hot melt adhesive composition of claim 1, wherein said composition exhibits a measured smoke value of no greater than 35 when measured according to the Direct Flame Flowing Gas Smoke Measurement Test Method.

5. The hot melt adhesive composition of claim 4, wherein said composition exhibits a measured smoke value of no greater than 55 when measured according to the Indirect Flame Sealed Chamber Smoke Measurement Test Method.

6. The hot melt adhesive composition of claim 1, comprising from 1% by weight to about 20% by weight said zinc source.

7. The hot melt adhesive composition of claim 1, comprising from 1% by weight to about 10% by weight said zinc source.

8. The hot melt adhesive composition of claim 1, comprising from 10% by weight to about 70% by weight aluminum trihydrate.

9. The hot melt adhesive composition of claim 1, comprising from 10% by weight to about 60% by weight aluminum trihydrate.

10. The hot melt adhesive composition of claim 1, comprising from 20% by weight to about 50% by weight aluminum trihydrate.

11. The hot melt adhesive composition of claim 1, comprising
from 1% by weight to about 20% by weight said zinc source; and
from 10% by weight to about 70% by weight aluminum trihydrate.

12. The hot melt adhesive composition of claim 1, comprising a source of magnesium hydroxide.

13. The hot melt adhesive composition of claim 12, comprising from 1% by weight to about 70% by weight said magnesium hydroxide.

14. The hot melt adhesive composition of claim 12, comprising from 1% by weight to about 10% by weight said magnesium hydroxide.

15. The hot melt adhesive composition of claim 12, further comprising from 1% by weight to about 5% by weight said magnesium hydroxide.

16. The hot melt adhesive composition of claim 11, further comprising magnesium hydroxide.

17. The hot melt adhesive composition of claim 1, comprising from 1% by weight to about 20% by weight zinc;

from 10% by weight to about 70% by weight aluminum trihydrate; and a source of magnesium.

18. The hot melt adhesive composition of claim 17, comprising from 1% by weight to about 70% by weight said magnesium source.

19. The hot melt adhesive composition of claim 17, wherein said source further comprises zinc borate.

20. The hot melt adhesive composition of claim 1, further comprising wax.

21. The hot melt adhesive composition of claim 1, wherein said source of halogen comprises halogenated wax.

22. The hot melt adhesive composition of claim 1, wherein said source of halogen is selected from the group consisting of chlorinated paraffin wax, chlorinated polyolefins, brominated paraffin wax, organic brominated compounds, and combinations thereof.

23. The hot melt adhesive composition of claim 1, wherein said composition has a viscosity less than 30,000 cps at 300° F.

24. The hot melt adhesive composition of claim 1, wherein said composition has a viscosity less than 20,000 cps at 300° F.

25. The hot melt adhesive composition of claim 1, wherein said composition has a viscosity less than 10,000 cps at 300° F.

26. The hot melt adhesive composition of claim 1, wherein said composition has a viscosity from 2000 cps to 15,000 cps at 300° F.

27. The hot melt adhesive composition of claim 1, wherein said composition intumesces upon burning.

28. A hot melt adhesive composition comprising ethylene vinyl acetate copolymer;

a zinc oxide;

at least one of aluminum trihydrate and magnesium hydroxide; and a source of halogen.

29. The hot melt adhesive composition of claim 28, further comprising zinc borate.

30. The hot melt adhesive composition of claim 28, comprising aluminum trihydrate and magnesium hydroxide, and further comprising zinc borate.

31. A hot melt adhesive composition comprising thermoplastic polymer;

zinc oxide;

magnesium hydroxide;

aluminum trihydrate; and a source of halogen.

32. The composition of claim 31, wherein said composition exhibits a measured smoke value of no greater than 45 when measured according to the Indirect Flame Sealed Chamber Smoke Measurement Test Method.

33. A hot melt adhesive composition comprising thermoplastic polymer;

zinc oxide;

magnesium hydroxide; and a source of halogen.

34. A hot melt adhesive composition comprising thermoplastic copolymer;

zinc oxide;

at least 20% by weight aluminum trihydrate; and a source of halogen.

* * * * *

UNITED STATES PATENT AND TRADEMARK OFFICE
CERTIFICATE OF CORRECTION

PATENT NO. : 6,943,207 B2 Page 1 of 1
APPLICATION NO. : 10/243110
DATED : September 13, 2005
INVENTOR(S) : Michael J. Chanak et al.

It is certified that error appears in the above-identified patent and that said Letters Patent is hereby corrected as shown below:

In The Claims

Col. 14, Line 21 Claim 2, delete "octene" and insert --octane--.

Col. 14, Line 56 Claim 12, delete "a source of".

Col. 14, Line 64 Claim 15, delete "further".

Col. 15, Line 3 Claim 17, after "20% by weight" insert --said source of--.

Signed and Sealed this

Fifteenth Day of August, 2006

JON W. DUDAS
*Director of the United States Patent and Trademark Office*